Patented Jan. 4, 1944

2,338,637

UNITED STATES PATENT OFFICE 2,338,637

POLYAMINE-ALDEHYDE CONDENSATION PRODUCT AND ITS PRODUCTION

Wolfgang Gündel, Dessau, Germany, assignor, by mesne assignments, to The Hydronaphthene Corporation, Wilmington, Del., a corporation of Delaware No Drawing. Application June 28, 1940, Serial No. 342,945. In Germany June 29, 1939

1 Claim. (Cl. 260—69)

This invention relates to condensation products obtained by condensing oxocompounds, materials capable of forming condensation products with oxocompounds and materials having besides the groups capable of forming oxocompounds salt groups formed from basic groups with acids and a process for their production.

In accordance with this invention it has been found that valuable condensation products are obtained by condensing oxocompounds and materials capable of forming condensation products with oxocompounds and by adding to the condensation mixture any materials having besides the groups being capable of condensing, salt groups formed from basic groups with acids.

As oxocompounds for the present method are to be named in particular formaldehyde or, respectively, any materials supplying formaldehyde such as paraformaldehyde, trioxymethylene, hexamethylenetetramine, formaldehyde bisulfite, methylal and the like. Besides these compounds other oxocompounds may likewise be used such as acetaldehyde, butyraldehyde, crotonaldehyde, benzaldehyde, acetone, methyl ethyl ketone, vinyl ethyl ketone, ethyl propyl ketone, acetophenone, mesityloxide, phorone, cyclohexanone or its homologues respectively and the like.

Known compounds which react with oxocompounds forming resin-like condensation products are, e. g., phenol and its homologues such as cresols, pyrogallol, resorcin, hydroquinone or its substitution products such as halogen phenols, phenols containing carboxylic groups such as salicylic acid, further naphthols and also aromatic oxocompounds either entirely or partially alkoxylated or esterified such as phenoxy acetic acid. Furthermore are to be considered urea, its substitution products or derivatives such as alkyl-urea, thio-urea or other amide derivatives of the carbonic acid such as urethane and guanidine or its derivatives, respectively, cyanamide, dicyandiamide, further diamides of dicarboxylic acids, dihydracids and the like. Moreover as condensable materials are to be named the compounds of the azine series such as methyl-diamino-triazine, triaminotriazine (melamine) and materials formed from same by splitting off ammonia such as melam, melem, mellon, further hydroxy-diamino-triazine (ammelin) as well as analogously constituted compounds of the pyrimidine and quinazoline series, guanazol derivatives, hydrazine derivatives of the hetero-cyclic series and the like. Finally there are likewise to be considered aniline, dimethyl aniline, xylidine, p-toluenesulfonamide, phenyl-hydrazine and the like as well as acetone, cyclohexanone and other ketones with reactive methylene groups.

To the condensation mixture of the aforesaid compounds in any stage of the condensation process materials are added which have besides the groups capable of condensing, salt groups formed from basic groups with acids. Thus salts of the following compounds are to be employed: guanidine and its derivatives such as methyl guanidine, phenyl guanidine, diphenyl guanidine, methyl phenyl guanidine, nitroguanidine, acetyl guanidine, guanyl-urea (dicyandiamidine), dialkyl-aminoalkyl-ureas and the like.

Among the salt forming acids are to be considered inorganic and organic acids such as hydrohalic acids, sulfuric acid, nitric acid, carboxylic acids particularly low molecular fatty acids and the like.

The condensation may be carried out by various methods and may be modified with regard to the quantitative proportions as well as with regard to the succession in which the reaction components are to be condensed. The materials reacting with oxo compounds to form resins, the oxocompounds and the materials containing salt groups may be condensed jointly from the beginning. But one may likewise proceed in such a manner that first condensation products are produced from the materials capable of reacting with oxocompounds to form resins and the oxocompounds or, respectively, from the materials having salt groups and the oxocompounds, whereupon the produced condensation products are reacted at any stage with the reaction component still lacking. It is particularly advisable to proceed in this way if the reactivity of the resin forming and salt groups bearing components with the applied oxo compounds show considerable differences.

The condensation components containing salt groups formed from basic groups with acids may be employed in any quantitative relations which may be only fractions or on the other hand several times the amount of the materials reacting with oxocompounds. In general the quantities of the materials containing salt groups are proportioned to the degree of the required solubility of the condensation products.

The condensation may be carried out either in a neutral medium without any catalysts or by adding any known catalysts, e. g., acids or salts having an acid reaction.

The working up is generally done to known methods. Thus, after the conversion is terminated the formed condensates may be separated, e. g., by pouring into some water or in a salt solution and may be dried in a suitable manner. In many cases the water used as solvent is simply distilled off whereby the formed resin is left.

If the condensation is carried out without the use of acid catalysts a neutrally reacting salt-resin is obtained. But after the use of any acid catalyst it is necessary subsequently to eliminate the acids in a suitable manner before the separation takes place in order to obtain a neutral final product. This can be done by quite a simple manner, i. e., in adding corresponding amounts of organic or inorganic bases or their salts with weak acids such as carbonates respectively. Furthermore organic bases which are capable of reacting with oxocompounds may be added and subsequently by heating for a further time the salt so formed by the neutralization is condensed into the already formed resin. Suitable materials of this kind are, e. g., guanidine and its derivatives or their salts with weak acids which are easily removed. Finally the excess acid may be eliminated likewise in such a manner that any materials are added which are not salt-forming but may be rearranged by means of acids into salt-forming materials such as dicyandiamide which may be converted by means of acids easily into the corresponding guanyl-urea-salt allowing to be condensed into the formed resin.

The process of the present invention according to a further embodiment may be carried out likewise by condensing the resin bases instead of the resin salts, i. e., the guanyl-urea itself instead of the hydrochloric salt of the guanyl-urea, and by neutralizing the basic groups in the obtained condensation products by means of acids.

The thus obtained condensation products possess according to the number of the existing salt groups and to the character of the used salt-forming acid groups a more or less intensive solubility in neutral and acid aqueous media. From these solutions according to the selection of the initial materials the resins can be precipitated in a more or less soluble form after addition of alkalis. These properties offer advantageous possibilities of application in technical applications for the obtained condensation products and particularly in the industries where resins are worked up, e. g., in the paper industry, in the cements and adhesives industry, further in the manufacture of printing colours and as anti-slipping-agents for polishing-waxes and driving-belt-waxes and the like.

Example 1

42 parts by weight of dicyandiamidine and 75 parts by weight of dicyandiamidine-sulfate are covered with 75 parts by volume of a 40% formalin. The mixture after addition of 60 parts of water is heated up under reflux for about 4 hours until boiling occurs. By pouring in into water the condensation product is precipitated in a form easily filtered and after drying a colourless powder containing about 20% of $SO_4$ is obtained.

While warming in strongly diluted mineral acids this powder dissolves easily and leaves no residue. By addition of alkali the resin base is separated in the form a voluminous precipitate.

Example 2

50.9 parts by weight of dicyandiamide and 65.1 parts by weight of crystallized biguanide sulfate are brought into 90 parts by volume of a 40%-formalin. The mixture is subsequently kept in a slow boiling state till the clear solution shows a distinctly perceptible enhancement of the viscosity which occurs within about 3 to 4 hours. Then the reaction mass is poured into ice water while stirring, whereby the condensation product is separated in a form permitting filtration. After drying a hard colourless resin is obtained containing about 17 to 18% of $SO_4$. which dissolves clearly in acidified warm water. From these solutions after an addition of alkali the resin base is separated in the form of a flaky precipitate.

Example 3

42 parts by weight of dicyandiamide and 78 parts by weight of the hydrochloric salt of the dicyandiamidine are mixed with 100 parts by volume of a 30% formaline. The mixture is then heated up to boiling for 3 hours under reflux. By stirring the liquid in an an ice cooled solution of common salt the formed resin salt is separated in the form of a crumbly precipitate easily filtered. After the remaining liquid is sucked off, the precipitate is dried at 50° C. The product is a colourless neutrality reacting powder which dissolves clearly in hot water. By addition of alkali the difficulty dissoluble resin base may be separated in the form of a thickly white precipitate.

Example 4

12.6 parts by weight of melamine are covered with 67.5 parts by volume of a 40%-formalin and warmed up in a boiling water bath for a short time. The clear solution is diluted with 150 parts by volume of water, then heated up to boiling; whereupon little by little a solution of 48 parts by weight of the hydrochloric salt of dicyandiamidine dissolved in 300 parts of water acidified with 20 parts by volume of 20%-muriatic acid are added. The mixture which remains clear is heated up to boiling under reflux for about 90 minutes to complete the conversion. Then in order to eliminate the hydrochloric acid required as catalyst an equivalent amount of dicyandiamide (9.2 parts by weight) is added, whereupon the reaction mixture is heated carefully till it no longer reacts Congo-acid and till the formaldehyde odour is nearly vanished. Now the solution is filtered, if necessary, and evaporated in vacuo until dry. There remains a water clear resin of a brittle hardness when cold containing 17 to 18% of chlorine. The product dissolves clear in hot water and more rapidly and without residue in diluted mineral acids. After an addition of alkalis the resin base is separated in the form of a thick gelatinous precipitate.

Example 5

36 parts by weight of dimethylol-urea and 48 parts by weight of dicyandiamidine sulfate are dissolved in 400 parts by volume of water. After an addition of 3 parts by weight of sulfuric acid the mixture is heated up to boiling for 3 hours. To eliminate the excess acid 5 parts by weight of dicyandiamide are added, whereupon warming is continued till the reaction mixture ceases to react Congo-acid. If the product looks turbid the solution is filtered and is evaporated in vacuo until dryness. We thus obtain a water clear neutral resin being of a brittle hardness when cold and capable of dissolving clear in hot water or in diluted acids.

*Example 6*

365 parts by weight of a 20%-hydrochloric acid solution are warmed up in a suitable apparatus to 50–60° C., whereupon 252 parts by weight of dicyandiamide are brought in little by little in the course of about 45 minutes, whereupon a temporary cooling is provided so that the temperature will not exceed 70° C. and the reaction will not take a vigorous course. After the whole quantity of dicyandiamide is brought in and the temperature has stopped rising by itself, the reaction-mixture is warmed up to 96° C. till it is no longer Congo-acid. Then, at 40° C. 300 parts by weight of a 40% formaldehyde solution are mixed in and the reaction mixture is warmed under reflux till the reaction commences, which then continues by itself without any external warming. To complete the conversion the reaction mixture is kept slightly boiling for an additional 4 hours. Now the water is distilled off preferably under reduced pressure and the resin remaining as residue is entirely freed from water at 100° C. in vacuo. It forms a clear brittle-hard salt resin which contains about 15% of chlorine and dissolves clear in water. The difficultly soluble resin base may be precipitated by addition of soda or soda lye.

I claim:

A resin-like product formed by condensation of dicyandiamidine, preformed dicyandiamidine sulfate and formaldehyde, said product being soluble in neutral and acid aqueous media.

WOLFGANG GÜNDEL.

CERTIFICATE OF CORRECTION.

Patent No. 2,338,637. January 4, 1944.

WOLFGANG GÜNDEL.

It is hereby certified that error appears in the printed specification of the above numbered patent requiring correction as follows: Page 2, second column, line 26, Example 3, for "neutrality" read --neutrally--; line 28, for "difficulty" read --difficultly--; page 3, first column, line 12, Example 6, for "96°" read --90°--; and that the said Letters Patent should be read with this correction therein that the same may conform to the record of the case in the Patent Office.

Signed and sealed this 29th day of February, A. D. 1944.

Leslie Frazer (Seal)

Acting Commissioner of Patents.